J. HART.
DRILL CHUCK.
APPLICATION FILED NOV. 13, 1914.
1,253,240.
Patented Jan. 15, 1918.
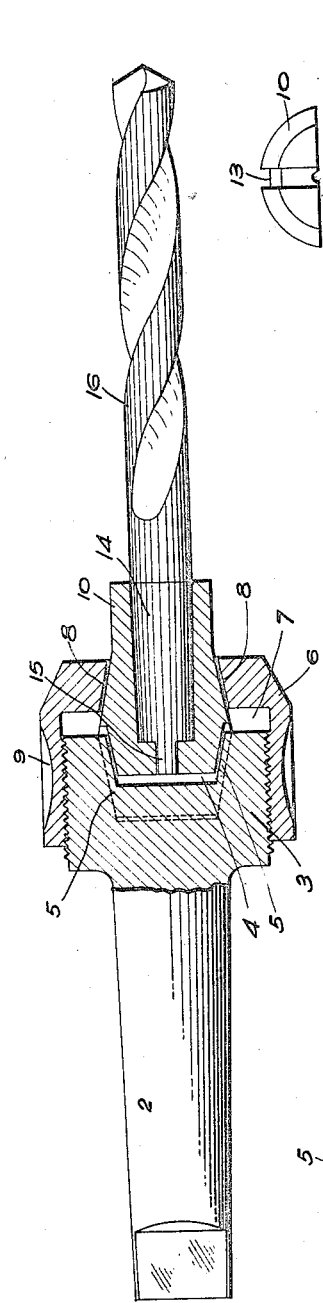
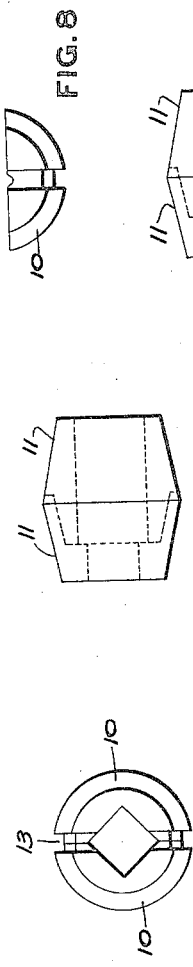
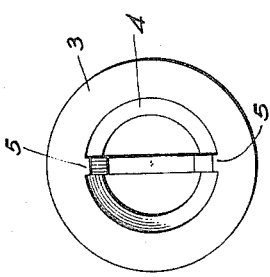
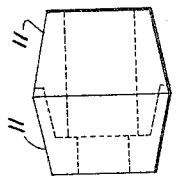
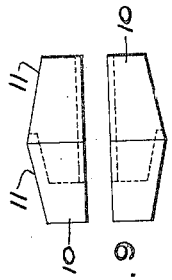
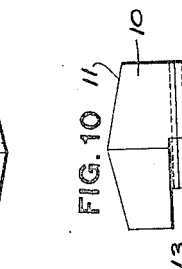
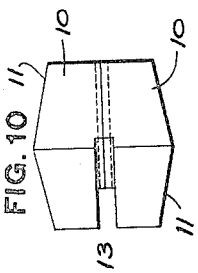
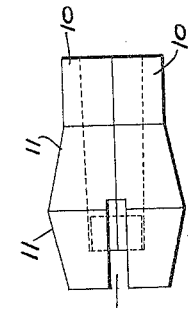
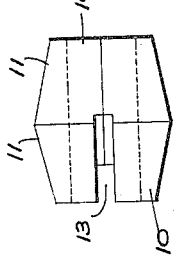
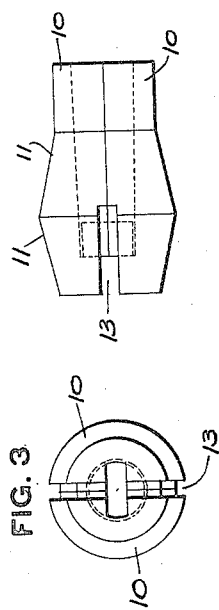
WITNESSES
Chas. Foxterman
R D Little
INVENTOR
James Hart
by C C Linthicum
his attorney

UNITED STATES PATENT OFFICE.

JAMES HART, OF JOHNSTOWN, PENNSYLVANIA.

DRILL-CHUCK.

1,253,240.

Specification of Letters Patent.  Patented Jan. 15, 1918.

Application filed November 13, 1914.  Serial No. 871,923.

*To all whom it may concern:*

Be it known that I, JAMES HART, a citizen of the United States, and resident of Johnstown, in the county of Cambria and State of Pennsylvania, have invented certain new and useful Improvements in Drill-Chucks, of which the following is a specification.

My invention relates to the construction of drill chucks used in securing drills in the sockets of the spindles of drilling machines and similar apparatus, and more particularly relates to the construction of the fastening means by which the drill is gripped and held in position in the socket while being rotated in the drilling operations.

One object of my invention is to provide a drill chuck of improved construction having novel means for gripping the drill shank, and for preventing relative rotation of the drill and socket when the drill is in use.

Another object of the invention is to provide a drill chuck having novel means whereby rotation or turning of the chuck jaws relative to the chuck in tightening and loosening the chuck is overcome and prevented.

Other objects of my invention consist in the novel construction and arrangement of parts more fully described hereinafter and particularly pointed out in the appended claims.

Referring now to the drawings forming part of this specification, Figure 1 is a side elevation, partly in section, showing a drill chuck constructed in accordance with my invention.

Fig. 2 is an end elevation showing the construction of the recess in the enlarged socket end of the chuck.

Fig. 3 is an end elevation, and Fig. 4 is a side elevation, showing the form of gripping jaws employed with my improved chuck in holding flat drills.

Fig. 5 is a side elevation, and Fig. 6 an end elevation, showing a modified form of chuck jaw adapted for use in holding drills having square shanks.

Fig. 7 is a side elevation of the chuck jaw shown in Figs. 5 and 6, the elevation being taken at right angles to that of Fig. 5.

Figs. 8, 9 and 10 are, respectively, an end elevation and side elevations, showing another modified form of chuck jaws adapted for use in holding a drill having a shank of substantially rectangular cross section.

In the accompanying drawings my invention is shown as applied to a drill socket. This drill socket has a shank 2 which is made to the standard Morse taper so as to fit the spindle of any drill press or machine tool of standard construction.

One end of the shank 2 is provided with an enlargement forming the chuck body 3, having a frusto-conical recess 4 in the end thereof, and projecting inwardly on opposite sides of the axial center of this opening are splines or integral tongues 5, 5. Preferably, the tongues 5 are formed integrally on the body 3.

The outer cylindrical surface of the enlargement 3 is screw threaded, and engaging with the screw threads are the threads of an internally threaded cap-nut 6. The cap-nut 6 has a recess or counterbore 7 and a tapering opening 8 therein, and its outer surface is provided with a series of grooves or recesses 9 for engagement with a spanner wrench by which the cap nut is turned in screwing the cap nut on the enlargement 3.

Secured in the oppositely tapering recesses formed in the enlargement 3 and cap nut 6, is a pair of gripping jaws 10, 10, which are provided with tapering surfaces 11 that engage with the correspondingly tapering surfaces in the recess 4 in the enlargement 3, and in the opening 8 in the nut 6. A groove 13 is provided in the surface of each section of the gripping jaws 10 so that when they are positioned in the chuck 6 the grooves form a taper opening engaging with the shank 14 and tang 15 of the drill 16 held in the chuck by the gripping jaws.

In Fig. 1 an ordinary twist drill having a taper shank is shown, and in this case the slots of the gripping jaws 10 are made to the same taper as the shank.

The frusto-conical end of each chuck jaw 10 is recessed so as to provide a wall between the faces thereof into which the splines or tongues 5 project when the jaws are in assembled position in the chuck recess, and in this way provide a sliding connection between the jaws and shank 2 of the chuck while positively preventing rotation of the jaws within the recess 4 in the enlarged end of the shank.

In the construction shown in Figs. 1, 3 and 4 the gripping jaws are made to fit a drill having a tapering shank of ordinary construction, and the constructions of Figs. 5, 6 and 7 show gripping jaws adapted for use in holding a drill having a shank which is square in cross section. In the constructions of Figs. 8, 9 and 10 gripping jaws are shown having grooves in adjacent faces thereof arranged to hold a flat drill or a flat drill provided with a bead on each flat side of the shank.

In assembling the parts as shown in Figs. 1, 3 and 4 of the drawings, a pair of gripping jaws 10, 10, to fit the particular type of drill to be used, is placed about the end of the drill shank 14. The drill shank and gripping jaws 10 positioned thereon are inserted in the recess 4 in the socket 3, and the cap nut 6 is then screwed on the enlarged end of the shank 2 of the drill chuck, a suitable spanner wrench being used in tightening the cap nut.

When the gripping jaws are positioned in the recess 4 the tongue or spline 5 enters the grooves formed by the registering recesses in the adjacent faces of the gripping jaws 10, and the taper surfaces 11 of the conical end of the gripping jaws engage the similarly tapering surface of the frusto-conical recess 4. The surface of the tapering opening 8 in the cap nut 6 in like manner engages the frusto-conical surfaces 11 on the other end of the gripping jaws 10, so that the gripping jaws are forced or wedged into tight holding engagement with the surface of the recesses in the drill shank and cap nut.

It will be noted that the cap nut 6 serves only to force the gripping jaws 10, 10, into gripping engagement with the shank 14 of the drill held between the jaws and that the tongue 5 in the recess 4 of the shank 2 of the chuck enters the groove formed between the gripping jaws, so that the gripping jaws are positively rotated by the drill chuck and do not depend upon frictional contact of the contacting surfaces of the gripping jaws and chuck. This is a particular advantage, as it is found in using such drill chucks, where the jaws are frictionally engaged by the chuck, that the jaws are forced into very close contact with the surfaces of the recesses in the drill socket and cap nut and require considerable force to release the jaws after the drilling operations.

When it is desired to remove a drill, or to replace one drill with another, a spanner wrench is employed to unscrew the cap nut 6 from the enlarged end 3 of the drill chuck. As the chuck jaws are positively held against rotation within the recess 4, the force required in unscrewing the nut 6 is considerably less than in the case of friction jaw clutches.

When the nut is removed the drill 16 is taken from between the chuck jaws and a new drill substituted, and the above described operations are then repeated in screwing the new drill in the chuck.

The advantages of my invention, which will be appreciated by those skilled in the art, arise from the manner in which the gripping jaws are secured and held in the drill chuck. The prevention of relative rotation of the jaws in the chuck body enables the necessary tightening effect of the double taper surfaces on the chuck to be obtained without binding the parts in position by a continued tightening effect, as results when friction faces solely are used.

Modifications in the construction and arrangement of the parts may be made without departing from my invention as defined in the claims.

I claim:—

1. A drill chuck comprising in combination an externally threaded chuck body having an inwardly tapering frusto-conical recess, an internally threaded cap-nut having a frusto-conical opening, a pair of chuck jaws having oppositely tapering frusto-conical external surfaces engaging the frusto-conical surfaces of the chuck body and cap-nut, and co-acting means on the chuck jaws and in the recess in said chuck body to positively prevent rotation of the jaws in said recess.

2. A drill chuck comprising in combination an externally threaded chuck body having an inwardly tapering frusto-conical recess, an internally threaded cap-nut having a frusto-conical opening, a pair of chuck jaws having oppositely tapering frusto-conical external surfaces engaging the frusto-conical surfaces of the recess in the chuck body and cap-nut, and registering tongues and grooves on the chuck jaws and in said recess to prevent rotation of the jaws in said recess.

3. A drill chuck comprising in combination an externally threaded chuck body having an inwardly tapering frusto-conical recess, an internally threaded cap-nut having a frusto-conical opening, a pair of chuck jaws having oppositely tapering frusto-conical external surfaces engaging the frusto-conical surfaces of the recess in the chuck body and cap-nut, and a projection in the recess engaging with the chuck jaws to prevent rotation of the jaws in said recess.

In testimony whereof, I have hereunto set my hand.

JAMES HART.

Witnesses:
H. W. SMITH,
W. MILT. BROWN.